(12) United States Patent
Robinson

(10) Patent No.: US 8,229,468 B1
(45) Date of Patent: Jul. 24, 2012

(54) USING INTELLIGENT AGENTS TO PERFORM FLOW PATH DISCOVERY IN TELECOMMUNICATIONS SYSTEMS AND NETWORKS

(75) Inventor: Bruce Robinson, Erie, CO (US)

(73) Assignee: Avaya Inc., Basking Ridge, NJ (US)

( * ) Notice: Subject to any disclaimer, the term of this patent is extended or adjusted under 35 U.S.C. 154(b) by 1217 days.

(21) Appl. No.: 12/019,993

(22) Filed: Jan. 25, 2008

(51) Int. Cl.
*H04Q 7/20* (2006.01)
(52) U.S. Cl. ............ 455/456.2; 455/401; 455/400
(58) Field of Classification Search .......... None
See application file for complete search history.

(56) References Cited

U.S. PATENT DOCUMENTS

| | | | |
|---|---|---|---|
| 2005/0064879 A1* | 3/2005 | McAvoy | 455/456.1 |
| 2006/0025158 A1* | 2/2006 | Leblanc et al. | 455/456.2 |
| 2007/0121529 A1* | 5/2007 | Meier | 370/256 |
| 2009/0270085 A1* | 10/2009 | Jones et al. | 455/420 |

\* cited by examiner

*Primary Examiner* — Joe Cheng
*Assistant Examiner* — Jason Harley
(74) *Attorney, Agent, or Firm* — Sheridan Ross P.C.

(57) ABSTRACT

The present invention provides methods, devices, and systems for modeling optimized flow path assignments for signaling and media traffic in a network connected population of telecommunications systems. More specifically, optimum inter- and intra-system flow path assignments can be determined based on, for example, a virtual simulation of the telecommunications system. The optimization criteria may include flow path properties, flow path length, flow path element degradation of voice quality, monetary cost of flow path element usage, and flow path element contribution to overall system availability.

19 Claims, 9 Drawing Sheets

USING INTELLIGENT AGENTS TO PERFORM FLOW PATH DISCOVERY IN TELECOMMUNICATIONS SYSTEMS AND NETWORKS

FIELD OF THE INVENTION

The invention relates generally to communication networks and more specifically to the discovery of flow paths in communication networks.

BACKGROUND

Constraint-based path selection aims at identifying a path that satisfies a set of constraints, such as Quality of Service (QoS) constraints. In general, this problem is known to be NP-complete, leading to the proposal of many heuristic algorithms. One of the key issues in all of these frameworks is how to identify efficient paths that can satisfy the given constraints.

Network graph propagation methods are one example of a method that can be employed to select network path flows based on given constraints. Network graph propagation methods are indifferent to the unique characteristics of nodes in the topology. These methods are slow, suffering from the NP-complete nature of this form of discovery. Other path selection methods suffer from many of the same shortcomings as network graph propagation methods. More specifically, most flow path assignment methods are relatively inflexible and inert to the qualitative effect that changing network dynamics (e.g., load, component failure rates, etc.) have on path properties, voice quality, jitter, delay, availability, and cost.

Whether trying to select network routes within a virtual or actual network topology, previously used techniques are processor intensive and slow. Accordingly, there is a need for a more efficient method to select and optimize flow path assignments for signaling and media traffic in a communication network.

SUMMARY

These and other needs are addressed by various embodiments and configurations of the present invention. The present invention is directed generally to a system, device, and method for optimizing flow path assignments for signaling and media traffic in an actual or virtual network. The method generally comprises:

propagating a signal through a plurality of communication components;

determining whether a recipient component of the signal is allowed to accept and forward the signal, wherein the determination is made by an intelligent agent associated with the recipient component; and accepting or refusing the signal on behalf of the recipient component based on the determination step.

In accordance with at least some embodiments of the present invention, the intelligent agent associated with a particular communication component is operable to perform a self-limiting evaluation of received signals on behalf of the associated component. Each component in a plurality of components may be equipped with such an intelligent agent such that the processing requirements are distributed throughout a communication system.

Accordingly, signal sources (e.g., components such as servers and endpoints) are stimulated to initiate registration and/or prototype signals. This signal conveys, in one embodiment, the signal's origin, its ultimate target, and a signal's characteristics (protocol, class, and type). Servers may initiate signals targeted at endpoints and other servers, while endpoints may initiate signals targeted at server agents and other endpoints. Components which are in direct communication with the initiating component (e.g., components wire-connected to the initiating component or in direct wireless communication with the initiating component) are asked to accept or refuse the candidate signal; acceptance or refusal is based on the properties of the recipient component and the properties of the signal's origin, target, and characteristics, as well as the signal's inbound direction (e.g., the wire), the signal's sender history, or properties of the interconnecting wire themselves (e.g., duplication or redundancy).

Upon accepting a signal for an associated component, the intelligent agent may perform any necessary protocol transformations, and then recursively submit the transformed signal to its own set of adjacent components. As the signal propagates across the system topology, the state of the propagation may be recorded in a tree structure.

When a targeted component receives a signal, the associated intelligent agent may respond with an acceptance signal. This response may be propagated back up the tree towards the initiating component. The response carries properties/characteristics of the intermediate agents such as distance, cost, and the QoS of the element as well as the properties/characteristics of the connections there between. These properties/characteristics may be summarized at each fork (or node) in the tree.

When a branch of the outbound propagation reaches a dead-end, a refusal signal may be transmitted back up the tree in the direction of the initiating component, resulting in the non-responsive branches to be pruned. On completion, each initiating component possesses a route prototype tree, or a failure node, for each initiate signal directed toward a particular target. These prototype trees may be used to provide a virtualization or real-time determination of optimum flow path discovery and assignment. In accordance with at least one embodiment of the present invention, the components and their associated intelligent agents could be used as a training tool, a path analysis tool, a network load analysis tool, and/or a component provisioning tool.

Use of intelligent agents at each component each having the ability to accept or refuse a candidate signal based on the properties of the signal origin, target, and protocol, class, and type, as well as the signal's recipient history or properties of component connections, provides a highly discreet and refined control over forward propagation of signal prototypes. This results in a quicker and more efficient method and system for selecting and optimizing signal flow paths.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The terms "a" or "an" entity refer to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic even if performance of the process or operation uses human input, whether material or immaterial, received before performance of the process or operation. Human input is deemed to be material if such input influences how the process or operation will be performed. Human input that consents to the performance of the process or operation is not deemed to be "material".

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

Terms "determine," "calculate" and "compute," and variations thereof, as used herein, are used interchangeably and include any type of methodology, process, mathematical operation or technique.

Terms "module" or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or switch(es), the invention is not limited to use with any particular type of communication system or configuration of system elements. Those skilled in the art will recognize that the disclosed techniques may be used in any communication application in which it is desirable to optimize network flows and flow paths.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
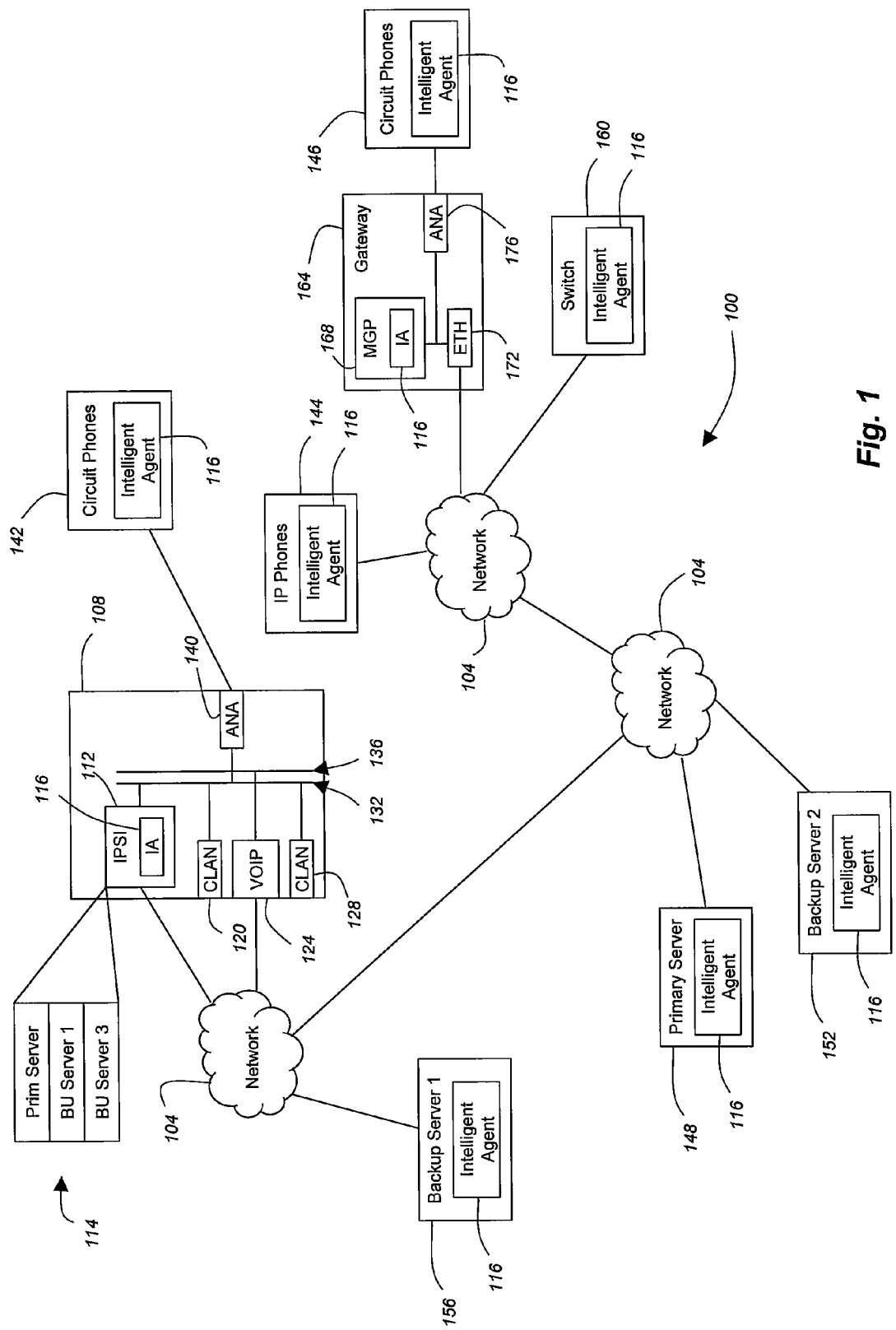
FIG. 1 is a block diagram depicting an exemplary communication system in accordance with embodiments of the present invention.

FIG. 1 shows a block diagram of an exemplary communication domain 100 in accordance with at least some embodiments of the present invention. The domain 100 may correspond to an actual communication system or a virtual communication system. The domain 100 contains all of the communication components that are to be interconnected for communication purposes. The components of the domain 100 may be separated between a number of different communication systems, each of which may correspond to a different enterprise network, for example. Each communication system may comprise one or more networks 104. The networks 104 may correspond to a standard Plain Old Telephone System (POTS), an Integrated Services Digital Network (ISDN), the Public Switched Telephone Network (PSTN), a Local Area Network (LAN), a Wide Area Network (WAN), the Internet, a Virtual Private Network (VPN), and any other type of packet-switched or circuit-switched network or collection of communication components known in the art.

In accordance with at least some embodiments of the present invention, the systems may further comprise locations, which correspond to a particular location of an enterprise network. The location may comprise a subset of the components contained within the system to which it belongs, and it is possible that a system contain one or more locations.

In the depicted embodiment, the domain 100 comprises a plurality of networks 104, each of which may correspond to a different system and some of which may belong to a particular location. Typical examples of networks 104 that belong to a particular location include LANs, while networks 104 that belong to a particular system, as opposed to a particular location, include a WAN, PSTN, or any other combination of communication elements. The communication components from one system may be connected to the communication components of other systems through shared networks 104 such a PSTN or the like. Such shared networks 104 may be serviced by a primary server 148 and a secondary server 152. Each of the servers 148, 152 operating the shared network 104 may contain an intelligent agent 116. The intelligent agent 116 of each server 148, 152 may be operable to help that particular component discover routes to other servers, switches, and endpoints for signaling and other data communications.

The primary server 148 may operate as the functioning server for the shared network 104 during normal operations. The backup server 152 may be used in instances where the primary server 148 becomes inoperable or overloaded by processing demands. In other words, the backup server 152 may remain inactive unless certain network circumstances occur that cause the primary server 148 to become incapable of fully supporting the shared network 104.

In accordance with at least some embodiments of the present invention, a port network 108 from one location may be connected to one of the networks 104, such as a first LAN. The port network 108 may contain a number of different components, including an Internet Protocol Server Interface (IPSI) 112, a first Collapsed LAN (CLAN) 120, a Voice over Internet Protocol (VoIP) chip 124, a second CLAN 128, a first data bus 132 such as a Time Division Multiplex (TDM) bus, a second data bus 136 such as a packet bus, and an analog circuit pack 140. Although only the IPSI 112 is depicted as including an intelligent agent 116, each of the components in the port network 108 includes an intelligent agent 116 to facilitate path discovery and optimization.

Each CLAN 120, 128 may represent the endpoint side of the port network 108 interface. The first CLAN 120 may be used to service endpoints in a first network region while the second CLAN 128 may be used to service endpoints in a second network region.

The IPSI 112 represents an intelligent device since it is used to control the initial signaling messages between communication components in the domain. More specifically, the IPSI 112 supports signaling communications to/from all endpoints serviced by the components in port network 108. Examples of such endpoints include circuit phones belonging to the collection of circuit phones 142 connected to the analog circuit pack 140. Each of the circuit phones in the collection of circuit phones 142 corresponds to an endpoint and each comprises its own intelligent agent 116. The IPSI 112 may also support signaling communications of other communication devices connected to the port network 108, each of which may also have an intelligent agent 116.

The IPSI 112, in accordance with at least one embodiment of the present invention, maintains an ordered list of servers 114 that define which server and backup servers should control a particular device. The server highest on the list will be the primary server to control the device. Thus, in the depicted embodiment, the primary server 148 may be the first choice as the controlling server for the IPSI 112. The first backup server 156 may be the second choice, and the second backup server 152 may be the third choice. The ordering of the controlling servers in the list 114 may be based upon the respective processing capabilities of each server as well as the processing requirements of the IPSI 112. The IPSI 112 may be connected to all of these servers via one or more networks 104. The network 104 connected directly to the port network 108, the port network 108, the collection of circuit phones 142, and the first backup server 156 may each be associated with a common location.

All of these components may be connected to other locations via the shared network 104. A second location may comprise another network 104, such as another LAN, a collection of IP phones 144, a gateway 164, a second collection of circuit phones 146, and a switch 160. The switch 160 may be used to service a second network region (e.g., a circuit-switched network region), while the collection of IP phones 144 may correspond to a first network region (e.g., a packet-switched network region). Each of these components in the second location, as well as the devices within the components, are represented by an intelligent agent 116.

The gateway 164 may comprise a Media Gateway Processor (MGP) 168, an Ethernet card 172, and an analog circuit pack 176. The Ethernet card 172 provides the gateway 164 with an interface to the packet-switched network 104, and the analog circuit pack 176 provides the gateway 164 with an interface to circuit-switched phones. The MGP 168 provides the processing capabilities to convert packet-switched messages to circuit-switched messages and vice versa. Each component in the gateway 164 may comprise an intelligent agent 116, although only the MGP 168 is depicted as comprising an intelligent agent 116. The MGP 168 is another example of an intelligent device that is used to service the circuit-switched phones in the second collection of circuit phones 146.

Endpoints in the collection of IP phones 144 and collection of circuit phones 146 may be adapted to communicate with other endpoints, such as the endpoints in the first collection of circuit phones 142. The communication between endpoints may be facilitated by the various other components in the domain 100, such as the servers, switches, gateways, networks 104, and the like.

The intelligent agents 116 contained within each communication component are used to distribute the processing and logic necessary to select flow paths from one component to another component. As will be described in further detail below, when a network component is determining the possible routes that can be used to transmit data to another endpoint, it transmits a signal prototype that fans out across the domain 100 topology. The state of the propagation may be recorded in a tree structure. When the signal prototype is received at another communication component, the intelligent agent 116 within that component makes a determination as to whether the corresponding component can accept the signal and generates a response accordingly. This response may be propagated back up the tree towards the initiator as well as forwarded if the component was determined capable of accepting the signal. The response carries the history of the signal including properties of the intermediate agents that the signal has already traversed, such as distance, cost, and QoS of the element and connecting wires. These properties may be summarized at each fork (or node) in the tree.

When a branch of the outbound propagation reaches a dead-end (i.e., a component that is not allowed to accept the prototype signal), a refusal signal is transmitted back up the tree in the direction of the initiator, and the non-responsive branches are pruned. After the signal prototype has spanned the entire domain 100, the initiator of the signal prototype possesses a route prototype tree, or a failure node, for each initiated signal to each target. Thus, flow paths can be prototyped using the distributed intelligence of the intelligent agents 116 maintained at each component. More specifically, the use of the intelligent agents 116, each with the ability to accept or refuse a candidate signal based on the properties of the signal (e.g., signal origin, signal target, signal protocol, and the signal's history or properties of the wires themselves), provides a highly discreet and refined control over forward propagation of signal prototypes, thereby increasing the efficiency of route prototyping and flow path optimization.

Many other components may be included in the domain 100, although such components have not been explicitly depicted. Examples of other components that may be incorporated into the domain 100 include, but are not limited to, Session Initiation Protocol (SIP) phones, Basic Rate Interface (BRI) phones, digital phones, expansion interface boards, and any other known type of communication device.

While an exemplary domain 100 comprising a plurality of networks 104 and associated communication components has been described, one skilled in the art will appreciate that path optimization methods of the present invention will apply equally to all variations of domain, system, and location configurations.

Figure 2:
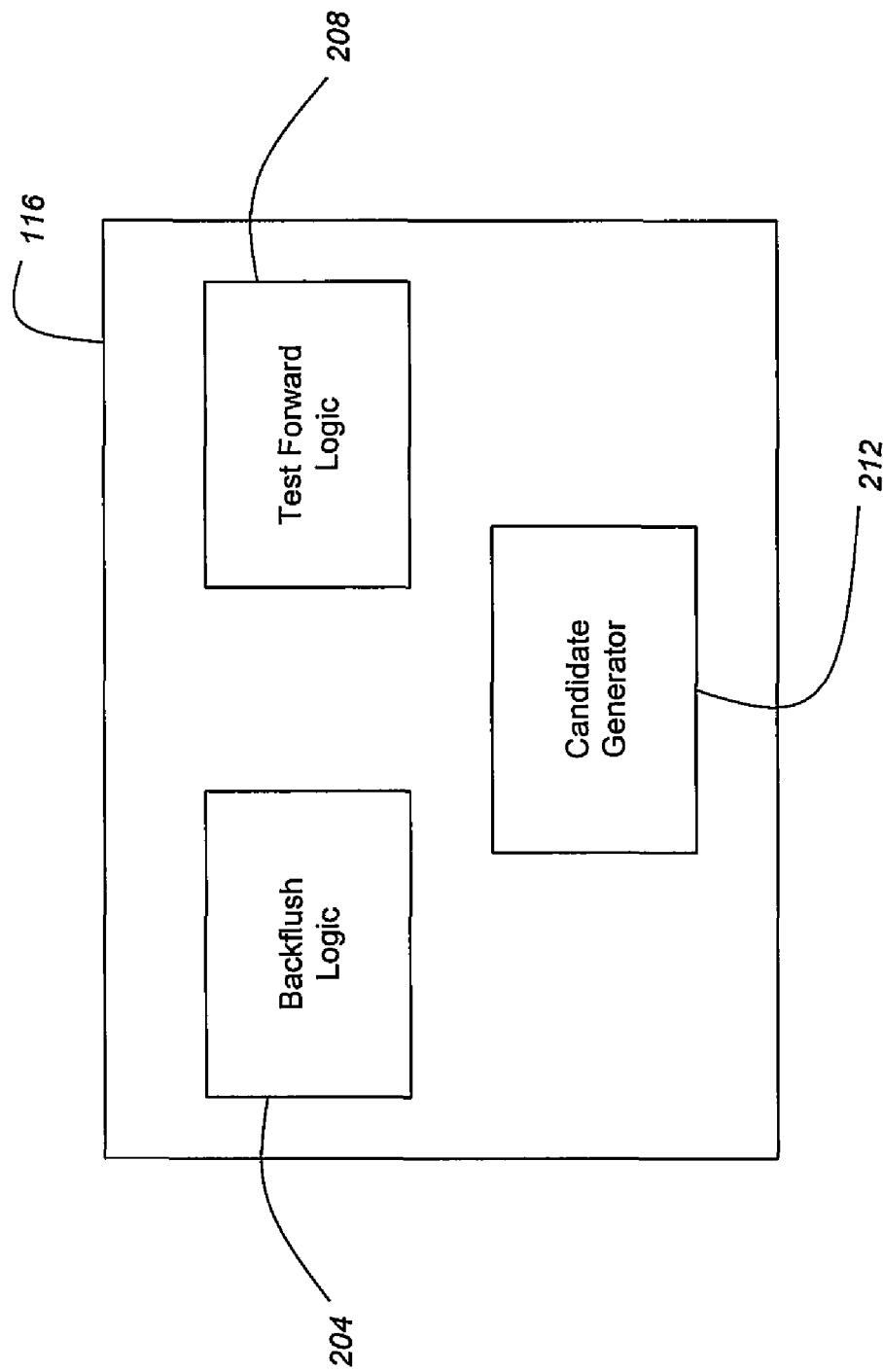
FIG. 2 is a block diagram depicting an intelligent agent in accordance with embodiments of the present invention.

Referring now to FIG. 2, details of an intelligent agent 116 will be described in accordance with at least some embodiments of the present invention. The intelligent agents 116 may be executed as background applications on each communication component in a real-time flow analysis. Alternatively, the intelligent agents 116 may correspond to an Application Specific Integrated Circuit (ASIC) programmed to make signal acceptance decisions based on properties of the signal as well as properties of the component. In a simulated environment, on the other hand, the intelligent agents 116 may correspond to logic routines independently executed for each component.

In accordance with at least some embodiments of the present invention, each intelligent agent 116 may comprise backflush logic 204, test forward logic 208, and a candidate generator 212. The backflush logic 204 may be used to check the history of a received signal prototype to determine if the corresponding component is allowed to receive and forward the signal based on whether the signal has already been seen by that component. The backflush logic 204 may analyze the history of the signal prototype to determine if the corresponding component is in the signal history (i.e., the signal has already visited the corresponding component). If the backflush logic 204 determines that the signal has already been received by the corresponding component, then the backflush logic 204 will determine whether to accept or reject the ping based on other considerations. As a default, if the backflush logic 204 identifies that the corresponding component is in the signal history, then the backflush logic 204 will reject acceptance of the signal. If, on the other hand, the signal history indicates that the corresponding component has not yet received the signal prototype, then the backflush logic 204 will allow the corresponding component to accept the signal prototype. There are, however, certain situations when this default logic may be altered. For instance, some components, such as a CLAN, may be allowed to accept a signal if it is already in the signal history provided that the CLAN is an IP CLAN and the signal is a Q Signal from one server to another server. Essentially, the backflush logic 204 will test to see if a signal prototype is trying to re-visit the same component more than once. The backflush logic 204 helps limit the signal prototype from making infinite loops in the network.

The test forward logic 208 analyzes the properties of the signal prototype to determine if the corresponding component is allowed to receive the signal based on what components the signal prototype can be forwarded to. Rather than checking the history of the signal prototype, the test forward logic 208 looks to the properties of the other outbound connections of the recipient component to determine if the signal can be forwarded on one or more of the outbound connections. Such a determination may be made based upon whether the signal protocol (e.g., Communications Manager (CM), TDM, Packet, IP, SIP, analog, etc.) can be accepted by an outbound connection or whether the type of signal (e.g., control signal, tone, Q Signal, or media signal) is supported by an outbound connection. If the test forward logic 208 determines that the signal can be forwarded to at least one other component, then the test forward logic 208 also allows acceptance of the signal prototype. Ultimate acceptance by the corresponding component requires approval by both the backflush logic 204 and test forward logic 208. If one of the logic modules indicates that the message cannot be accepted, then the signal is denied and a refusal signal is sent back to the originating component.

The candidate generator 212 may be employed to generate one or more new signal prototypes for forwarding to other components, depending upon the acceptance determination of the logic modules 204, 208. If a new signal prototype is to be forwarded to other components, then the candidate generator 212 updates the signal prototype history to reflect the signal's acceptance by the corresponding component and performs any necessary protocol and/or signal type transformations. Once the signal prototype has been prepared, the candidate generator 212 forwards the signal prototype to all other components that it can, other than the component from which the signal prototype was previously transmitted. The forwarded signal prototype is then received at the next components with the updated history where their intelligent agents 116 perform a similar analysis of the signal prototype.

Figure 3:
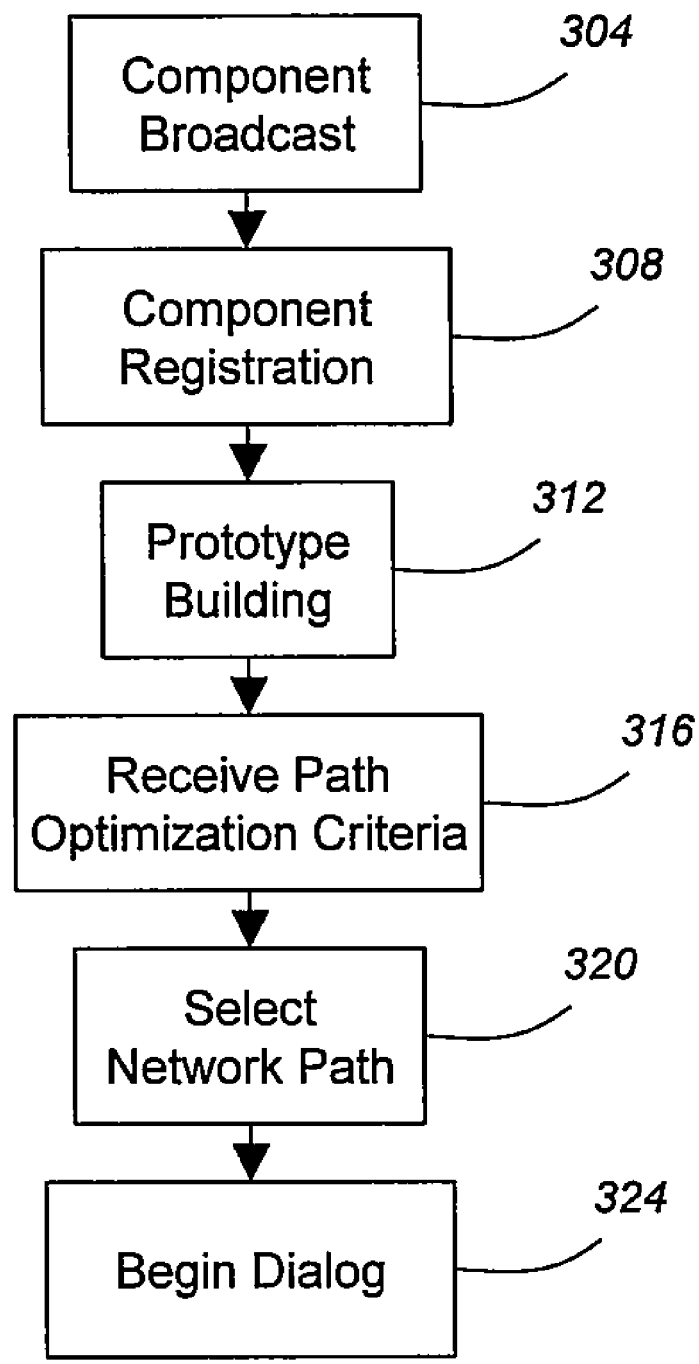
FIG. 3 is a flow diagram depicting a method of optimizing network path selections in accordance with embodiments of the present invention.

With reference now to FIG. 3, a method of optimizing network path selections will be described in accordance with at least some embodiments of the present invention. The method is initiated when each terminal component (e.g., endpoint, server, switch, etc.) in the domain 100 broadcasts its existence to all other components in the domain 100 (step 304). This step may be regarded as a simple discovery phase where each component sends out an indiscriminate ping that can be accepted by all other network components, who, upon receipt of the broadcast ping, send a reply signal back to the originator. The purpose of this particular step is to allow each component to become aware of all other components in the domain 100 so that the component can determine which other components it would like to select as target components. The data set generated for each components performing a broadcast is a general list of any component that receive its broadcast ping. The data set may indicate the names of such components that have responded to the broadcast ping. At this point, the components do not necessarily need to be provided with the addresses (e.g., IP addresses, MAC address, phone numbers and extensions, etc.) of all other components. Rather, the broadcasting component is just trying to gain an awareness of the mere existence of the other components within the domain 100.

After the broadcasting step has completed, the intelligent agent 116 in each terminal component contains a generic list of all other components in the domain 100. Next, the components register communication paths with as many other components in the domain 100 as possible (step 308). During the registration step, a component will determine legal communication flow paths to other endpoints based on communication protocols, signal types, etc. In accordance with at least some embodiments of the present invention, the servers 148, 152, 156 will first register will all intelligent devices such as the IPSI 112, MGP 168, and any other device that control signaling for certain networks. Since each intelligent device maintains an ordered list of controlling servers 114 list, the intelligent agents 116 of the intelligent devices will determine the priority of use for each server registering with the intelligent device. This allows each server to know whether it can communicate with certain endpoints based on the intelligent device(s) that control communications to that endpoint. After the server has registered with the intelligent devices, the server continues by registering with the rest of the endpoints in the network. Once the server has registered with all possible components in the domain 100, the other components begin registering communication paths with other endpoints in the domain 100.

At this point, the components in the domain 100 know which devices are controlling their operation, and the next step is to determine how dialogs can be transmitted between various components. After the servers and other devices have registered their communication paths with all other components, dialog protocols are registered (step 312). During this prototype building step, the servers and other communication devices will determine which paths certain signals can be transmitted along. A prototype ping is used where a registration ping was previously used. The prototype ping comprises information related to the signal's origin, target, protocol, history, signal type (e.g., tone signals, signals for data transmissions between servers and endpoints, media between endpoints, Q Signal between servers and switches, etc.), and signal class (Each server will create a route prototype for all servers using Q Signal type signals. These particular signals can only be accepted and forwarded by certain components. The intelligent agents 116 of each component in the domain 100 will make a determination as to whether it can accept and forward a Q Signal. Thus, when building a route prototype for intra-server communications, a Q Signal is used, whereas when an endpoint builds a route prototype for a communication path with another endpoint, a media type signal is used. A tone type signal may be used for communications between a switch/server and endpoint. In accordance with at least some embodiments of the present invention, signals, Q Signals, and other signal classes correspond to a metaphor or a virtual representation of various high-level control signals that are transmitted in an actual communication. These various control signals differ from media signals that are traditionally transmitted between endpoints (or from a switch/server to an endpoint in the case of a tone signal). The operation of these signal classes as a representation of a control signal in a virtual realization of the present invention will be described in further detail below.

The construction of route prototypes also identifies the capabilities, costs, and characteristics of each node that is involved in a particular route prototype. As prototype pings are accepted and forwarded, the accepting intelligent agent 116 incorporates the relevant values into the signal history so that when the route is completely prototyped, the costs, QoS properties (e.g., voice quality, jitter, delay, etc.), route length, and other properties of each node and communication path are known by the originating component. This way, the originating component has a plurality of communication paths prototyped and knows what characteristic costs would be associated with using each path. Thus, the component can decide what path a particular signal should be flowed on based on predetermined optimization criteria.

Once each component has prototyped all paths with all other components, the method continues with a component determining to send a signal (e.g., because a user has initiated a call). Upon making such a determination, the component receives its path optimization criteria (step 316). Path optimization criteria may include maximizing and/or minimizing certain characteristics of the path. Examples of such criteria that may be considered during maximization and/or minimization efforts include, but are not limited to, path length, path element degradation of voice quality (i.e., QoS), monetary cost of path element usage (such as PSTN), and path element contribution to overall system availability. Combinations of the optimization criteria may be maximized and/or minimized depending upon user and system preferences. For example, one set of optimization rules may include a combination of maximizing QoS AND minimizing monetary cost of path element usage. As another example, a set of optimization rules may include a combination of maximizing QoS or maximizing overall system availability. In such an example, the path will be selected depending upon which criteria is maximized more.

After the optimization criteria have been received, the component selects a network path (step 320). This particular step analyzes the path prototypes, which have already been built, based on the optimization criteria to determine which branch of the prototype tree will best meet the optimization criteria. After the branch has been selected that best suits the optimization criteria, the originating component begins to dialog with the corresponding other components on the selected communication path (step 324). The dialog may include sending a control signal (e.g. "use TDM time slot x") to another component, sending a tone to another component, or sending/receiving media to/from another component.

Figure 4:
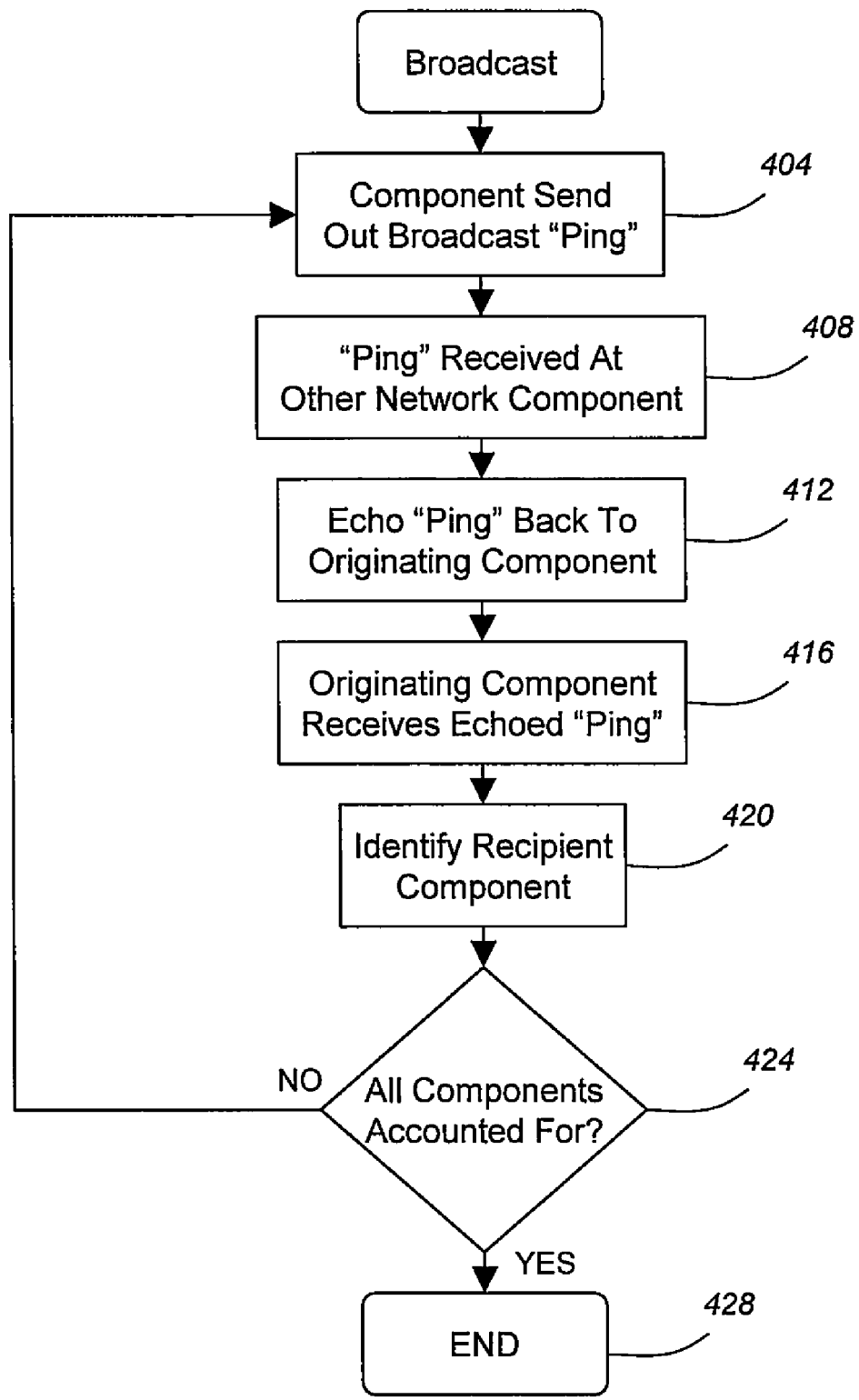
FIG. 4 is a flow diagram depicting a broadcast method in accordance with embodiments of the present invention.

With reference now to FIG. 4, a broadcast method will be described in further detail in accordance with at least some embodiments of the present invention. The method is initiated when a terminal component (e.g., endpoint, server or switch) sends out a broadcast ping to other components in the domain 100 (step 404). The broadcast ping may be transmitted on all outbound wires and communication modalities available to the originating component. The broadcast ping is intended to be sent to propagate to all other components in the domain 100, thereby allowing the originating component to gain an awareness of the constituents of the domain 100.

When the broadcast ping is transmitted, it is received at a component adjacent to the originating component (step 408). When the broadcast ping is received at this other component, the receiving component transmits an echo ping back to the originating component (step 412). The echo ping comprises the identity of the recipient component as well as the recipient component's capabilities (e.g., whether the component is an intelligent device or not) and is targeted toward the originating component. The echo ping may travel back to the originating component along the same path on which it was originally transmitted. The echo ping is not analyzed by the intelligent agents 116 of the intermediate components, but is instead forwarded back toward the originating component by any intermediate components until it eventually reaches the originating component (step 416). When the originating component receives an echo ping, it analyzes the portion of the echo ping that identifies the component that originated the echo ping, thereby allowing the originator of the broadcast ping to identify the recipient of the broadcast ping (step 420).

The broadcast ping is propagated throughout the domain 100 until every component has been accounted for (i.e., every component has received the broadcast ping and responded with an echo ping) (step 424). If it is determined that every component has been accounted for, then the method ends (step 428), otherwise the method continues with the originator of the echo ping forwarding the broadcast ping on to any other connected components in the domain 100 (step 404). This forward propagation of the broadcast ping ultimately allows the originator of the echo ping to gain an awareness of every component in the domain 100. Moreover, the originating component can maintain in its memory a list of the components that it has identified as belonging to the domain 100. In accordance with at least some embodiments of the present invention, it may not be necessary for every component to originate a broadcast ping. Rather, each broadcast ping may be forwarded with the identification information of the originating component as well as any other component that has already received the broadcast ping. This will allow any subsequent recipient of the broadcast ping to gain an awareness of all components that have already received the broadcast ping. This may allow some components to identify all of the other components in the domain 100 without having to transmit a broadcast ping. However, it may be desirable to require each component to transmit a broadcast ping just to verify that all components have an awareness of all other components in the domain 100.

Figure 5:
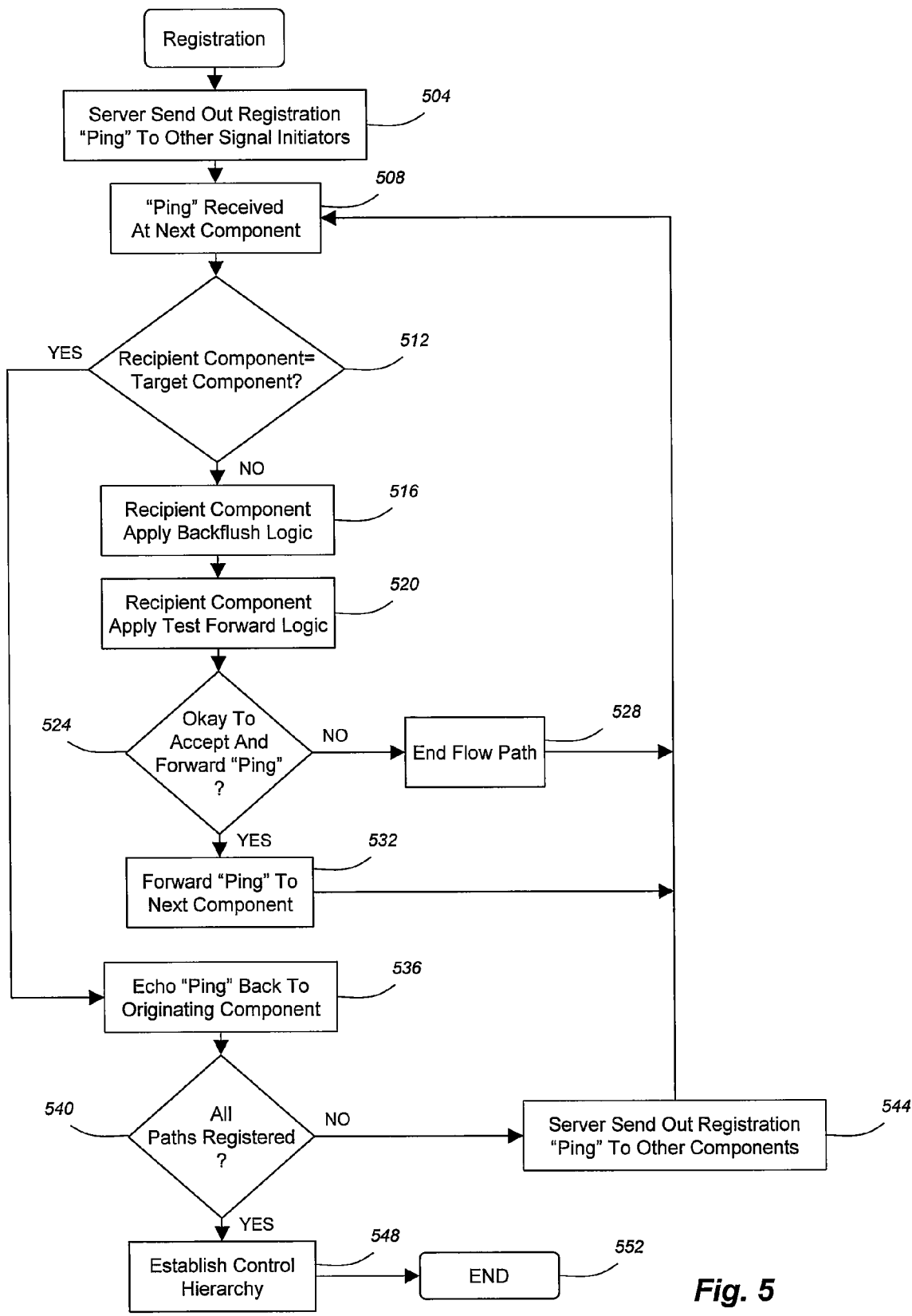
FIG. 5 is a flow diagram depicting a registration method in accordance with embodiments of the present invention.

Referring now to FIG. 5, details of a registration method will be described in accordance with at least some embodiments of the present invention. The method begins when a server sends out a registration ping to the intelligent devices in the domain 100 (step 504). The intelligent devices may be identified during the broadcast step based on each component's response to the broadcast ping. The component originating the registration does not know the addresses of the target components nor does it know which route(s) may be used to communicate with the component. Therefore, the registration ping is transmitted with an identification of the target component from all possible outbound branches. Therefore, the registration ping is propagated throughout the domain 100 in a similar fashion to the broadcast ping. The registration ping(s) are received at components adjacent to the originating components (step 508). This recipient component checks the identified target of the ping to determine if it corresponds to the identified target (step 512).

In accordance with at least some embodiments of the present invention, a registration ping includes a number of different portions that can be used by a recipient intelligent agent 116 to determine whether the associated component is allowed to receive and forward the registration ping. In accordance with one embodiment of the present invention, the registration ping comprises an origin identification portion, a target identification portion, a protocol portion, and a history portion. The origin and target identification portions identify the registration ping originating component and target component, respectively. The protocol portion comprises information that identifies the type of communication protocol that the registration ping is currently using (e.g., the current protocol state) as it is transmitted across a certain transport medium. Examples of protocols that may be identified in the protocol portion include, without limitation, Communication Manager (CM) protocol for signals between a server 148, 152, 156 and IPSI 112, TDM protocol for media/tone signals inside a port network 108, inside gateways, and for signals to/from circuit phones 142, 146, packet protocol for signals inside a portnetwork, IP for signals on the IP network 144, and SIP for signals on IP network 144 between a switch 160 or server, for example, and SIP phones and/or an edge switch 160 or server.

The history portion of the registration ping may identify the travel history for the registration ping. This history portion may be updated by the intelligent agent 116 each time the registration ping is accepted and forwarded. Therefore, when a registration ping is received at a component, the corresponding intelligent agent 116 applies the backflush logic 204 to determine if the registration ping can be accepted based on the travel history of the registration ping (step 516). Since the history portion of the registration ping includes information related to the previous forwarding components as well as the path on which the ping has traveled between components, the backflush logic 204 can determine whether it has previously received a particular registration component.

In addition to analyzing the ping with the backflush logic 204, the intelligent agent 116 may also analyze the ping with the test forward logic 208 (step 520). The test forward logic 208 may determine whether the registration ping can be forwarded on any outbound transmission mediums available to the component in its current form (e.g., based on the comparison of the protocol portion of the ping and the capabilities of outbound transmission mediums). Moreover, if no output transmission medium matches the needs of the current protocol, the test forward logic 208 may determine whether the component is capable of changing the registration ping protocol to another protocol that can be forwarded by the component. For example, an IPSI 112 is capable of changing a registration ping protocol between TDM and packet for transmission on different communication busses 132, 136, if necessary.

In step 524, it is determined if the analysis by either the backflush logic 204 or test forward logic 208 fails for any reason. If either logic module 204, 208 has determined that acceptance is not allowed for the component, then the flow path ends and the registration ping is rejected by the corresponding component (step 528). In this step, the recipient component may transmit a refusal message back toward the ping originator indicating that the flow path has ended. This refusal message will allow the originating component to know that the path leading to the rejecting component is a dead path when it comes to transmitting the type of signal that was originally represented by the registration ping. Upon receiving the refusal message indicating that a dead-end was reached, the originating component may prune the branches from memory If, on the other hand, the intelligent agent 116 determines that the corresponding component is capable of accepting and forwarding the registration component, then the candidate generator 212 is used to forward the ping on to the next component(s) (step 532). When the forwarded registration ping is received at the next component (step 508), the component determines whether it is the target component (step 512). If the recipient component does not correspond to the target component identified in the target identification portion of the registration ping, then the method continues to step 516 again. If, however, the recipient component does correspond to the target component, then the method continues with the target component transmitting a branch complete message back to the originating component (step 536). The branch complete message contains the entire flow history of the registration message, which can be employed by the originating component to register a communication branch that can be used to send a particular type of message to the target component. In accordance with at least one embodiment of the present invention, the branch complete signal may only be transmitted back to the originating component by the target component. This way the originating component does not have to dynamically maintain a record of the communication branches, but rather only has to register communication branches that successfully reached the target component. In accordance with an alternative embodiment, however, the candidate generator 212 of each intermediate recipient component (i.e., each component between an originator and target that accepts a registration ping) may also generate an acceptance message that is transmitted back to the originating component. This allows the originating component to dynamically update its records of the possible communication paths. In this particular embodiment, when a refusal signal is received, the entire branch that was previously built is pruned.

After the branch complete message has been received by the originating component, the originating component determines if all paths have been registered (step 540). This particular step may include a number of different determinations. First, the originating component may determine whether all of its possible communication branches with an intelligent device have been registered. This determination may be made by determining whether there are any more outwardly propagating registration pings with an intelligent device as its target component. If at least one registration ping is still propagating toward an intelligent device, then the originating component will continue to wait until all possible communication paths with intelligent devices have been registered. If all communication paths with the intelligent devices have been registered, then the originating component will register with all other components in the domain 100 (step 544). Thus, the determination in step 540 may include analyzing whether all components have been registered, if possible. By registering the intelligent devices before the other components, the originating component is able to establish which intelligent devices are in charge of certain communication networks and groups of endpoints. This allows the originating component to expedite the registration of the other components because it already knows which intelligent device it needs to send the registration ping toward.

Once all communication paths have been registered, the originating component establishes the control hierarchy for each endpoint, switch, and other server (step 548). The control hierarchy may be determined by analyzing the contents of received acceptance and/or branch complete messages, since those messages may include an ordered list 114 identifying which server will be used to primarily control a particular component. The control hierarchy is negotiated between all servers to determine which server will communicate with a particular component in certain situations. When the control hierarchy has been established, the method ends (step 552). Although the registration of servers with other components has been described in accordance with the depicted figure, a similar process may be followed for registering communication paths from endpoints, switches, and other components to the rest of the domain 100.

Figure 6A:
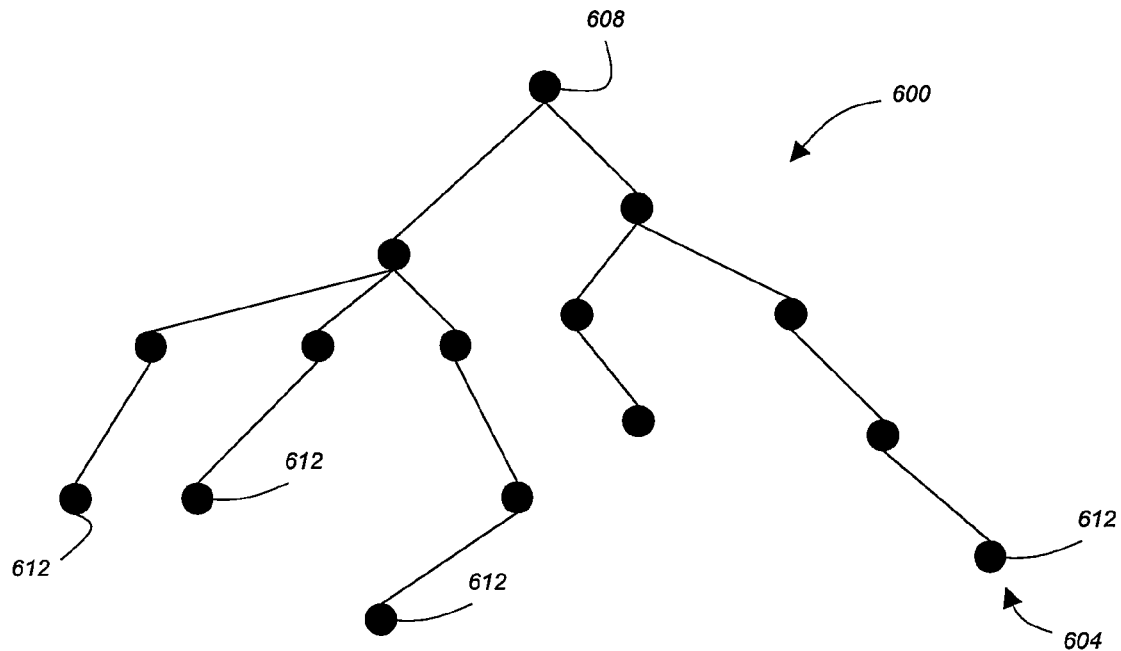
FIG. 6A is a logical representation of possible network paths from one network component to another network component as determined by registration in accordance with embodiments of the present invention
Figure 6B:
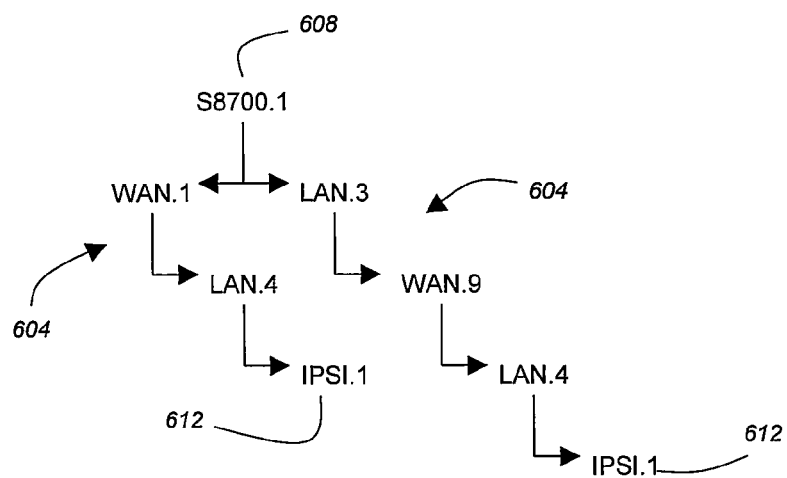
FIG. 6B is a close up view of a network path branch in accordance with embodiments of the present invention.

FIGS. 6A and 6B show a logical depiction of an exemplary path tree 600 that is generated by an originating component 608 during and after registration. More specifically, FIG. 6A depicts a number of nodes corresponding to components in the domain 100 that may be registered as legal communication mechanisms that can carry signals to a certain target endpoint 612 (e.g., servers, switches, devices, endpoints, etc.). Each intervening nodes between the originating 608 and target 612 node may correspond to any intervening components. The line connecting each node in the tree 600 represents a transmission medium (e.g., wires, data busses, wireless communication mechanisms, and so on) that can be used to connect one component to another component. Each branch 604 of the tree 600 represents a possible communication path from the originating component 608 to the target component 612 with all of the intermediate components also residing on the same branch. A number of different tree structures 600 may be maintained by a component for each possible target component 612 such that each terminating node in the tree 600 may correspond to the same target component 612. In such an embodiment, each branch 604 may represent a different communication path that can be used to reach the same target component.

In accordance with at least some alternative embodiments of the present invention (not depicted), a single tree structure 600 may be used to represent all possible outbound communication paths from an originating component 608. Accordingly, each terminating node 612 in the tree 600 may be a different target component.

FIG. 6B depicts an exemplary close-up view of two branches 604 of the tree 600. The exemplary branches 604 show that the originating server 608 can communicate with a particular IPSI 112 612 by transmitting a signal through a series of networks 104 (e.g., third LAN to ninth WAN to fourth LAN to the IPSI 112 or first WAN to fourth LAN to the IPSI 112). There may be other branches 604 that connect the IPSI 112, with the server 608, but the different branches would have to have at least one different, additional, and/or lesser node than the depicted branches 604.

Figure 7:
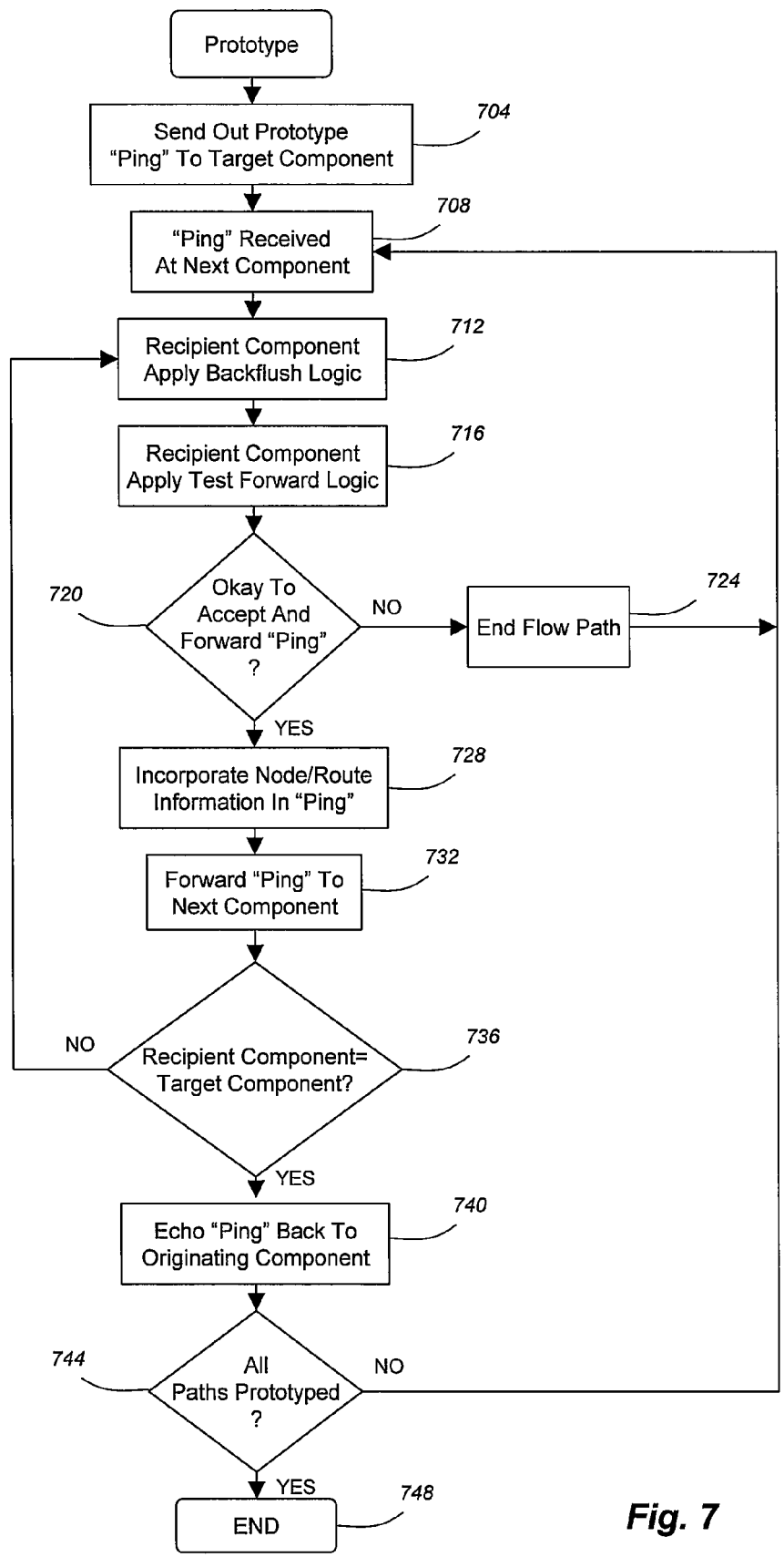
FIG. 7 is a flow diagram depicting a prototype method in accordance with embodiments of the present invention.

Referring now to FIG. 7, details of a route prototype method will be described in accordance with at least some embodiments of the present invention. The method begins when an originating component, such as a server 148, 152, 156, sends out a prototype ping to a target component (step 704). The prototype ping may be transmitted along each branch 604 of the tree 600 that was built during the registration step.

In accordance with at least some embodiments of the present invention, the prototype ping may comprise a number of different portions such as, for example, an origin identification portion, a target identification portion, a history portion, and a signal characteristics portion (comprised of a protocol, signal type and a signal class). The origin identification, target identification, signal characteristics, and history portions of the prototype ping may be similar to the same portions of the registration ping described above. In addition to these portions, the prototype ping characteristics include the signal protocol, the signal type portion to identify the type of signal that is being transmitted (e.g., the current signal type state) from one component, to another component as well as the signal class portion to identify the class of signal being transmitted (e.g., the current signal class state). Examples of signal type states that may be identified in the signal type portion include, without limitation, a control signal, a tone signal, a Q Signal (for intra-server communications), and a medium. Examples of signal class states that may be identified in the signal class portion include, without limitation, off-hook, tone (e.g., dial tone), dial (e.g., dial number), invite, ringing (e.g., ringback), ring (e.g., ring phone), pickup, busy, no answer, answered, ask, answer, hang up, end ring, end call, register, Interactive Voice Response (IVR) message and TTR message (e.g., the dialog between a call center customer and an IVR system), announcement and message (e.g., the dialog between a dialer and a Call Management Services (CMS) messaging system, call setup, and call tear down. The signal classes may also include SIP messages such as INVITE, 180 RINGING, 200 OK, ACK, and any other known SIP messages.

The additional portions of the prototype ping are used by the intelligent agents 116 to further refine the possible paths that may be used by an originating component to communicate a particular signal, as defined by the signal class and signal type, with a target component. In accordance with at least some embodiments of the present invention, route prototypes are built from servers to other servers, from servers to switches, from servers to endpoints for control signals and tones, and between endpoints for media. After a route has been prototyped for control signals and tones, a virtual Q Signal signal type is used to determine which servers are involved in a particular call (e.g., to establish current server control over a call).

Once the servers have built their route prototypes with other servers, switches, and endpoints, the switches build their route prototypes with other servers, switches, and endpoints. Thereafter, the endpoints build route prototypes for control signals to servers and switches. Finally, the endpoints build route prototypes for media signals to other endpoints.

Thus, the method described in FIG. 7 may be equally applied by a server, switch, endpoint, or any other component. After the prototype ping has been sent out by the originating component, the ping is received at an adjacent component (step 708). The recipient component proceeds by applying the backflush logic 204 (step 712) and test forward logic 208 (step 716) to the received prototype ping. The backflush logic 204 checks the ping travel history to determine if the received ping has been previously visited by the same component, and if such revisit is allowed; this logic prevents the ping from traveling in an infinite loop. The test forward logic 208, on the other hand, examines the properties of the prototype ping (e.g., the protocol, signal type, and signal class) to determine if the corresponding component can be used to carry or transmit the prototype ping. In other words, the intelligent agent 116 of the recipient component acts as a self-limiting decision making entity that allows or denies acceptance of a prototype ping based on whether the component can handle the particular ping as well as whether the controlling server (e.g., as determined by referencing the ordered list of servers 114) is active for the call. If the intelligent agent 116 determines that the corresponding component fails any of these tests (step 720), then the flow path is terminated for the prototype (step 724). After such a determination, the refusing component may engage the candidate generator 212 to send a refusal signal back to the originating component, and then the method returns to step 708 until all other prototype pings are either terminated or reach the target component.

If the intelligent agent 116 determines that the corresponding component is capable of receiving the prototype ping, then the method continues with the candidate generator 212 incorporating the node/route information (e.g., cost to use the component, availability of the component, estimated QoS associated with the component, etc.) associated with the component into the history portion of the prototype ping (step 728). Once the prototype ping has been updated with characteristic information for the accepting component, the new candidate prototype ping(s) is forwarded to the next component(s) (step 732). The recipient component then determines whether it is the target component (step 736). If the recipient component is not the target component, then the method returns to step 712.

If, on the other hand, the recipient is identified as the target component in the target identification portion of the prototype ping, then the method continues with the target component transmitting an echo or branch complete ping back to the originating component (step 740). The echo ping may include the entire travel history of the prototype ping. Accordingly, the originating component can determine which nodes lie on the particular branch 604 that was traversed as well as the characteristics of each node on the branch. The method continues by determining whether all paths have been prototyped (step 744). This determination may consider whether all servers, switches, and/or endpoints included in the domain 100 have prototyped communication paths with all other components in the domain 100. This determination may not be made affirmatively until every component has prototyped every route for every necessary signal type and signal class. If there are still paths that need to be prototyped, then the method returns to step 708. If all paths have been prototyped, then the method ends (step 748).

Figure 8:
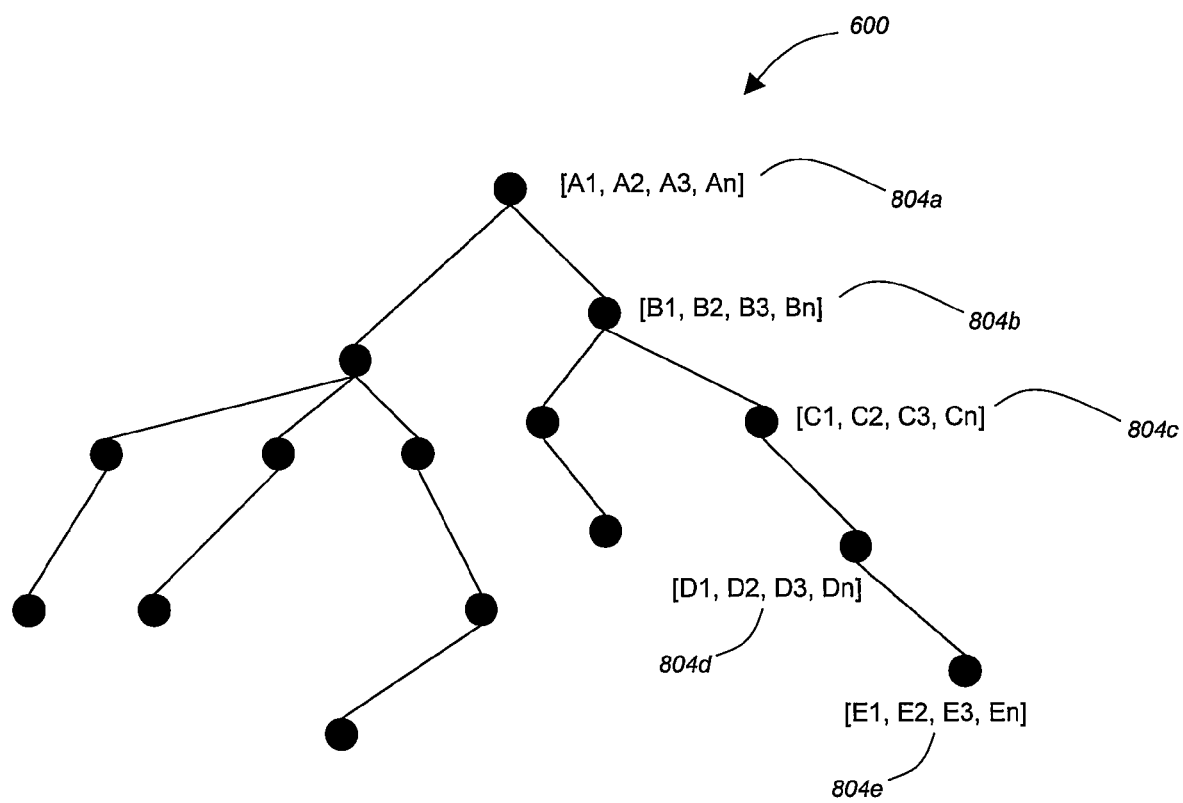
FIG. 8 is a logical representation of possible network paths and their associated costs in accordance with embodiments of the present invention.

FIG. 8 is a logical depiction of a tree 600 after all routes have been prototyped in accordance with at least some embodiments of the present invention. The tree 600 may comprise a number of branches created by a collection of nodes as well as the characteristics 804a-N for each node. The characteristics enumerated for each node may define the costs associated with sending a signal across the node, the signal degradation experienced by a signal passing through the node, other QoS parameters associated with the node, the length from the previous node, the availability of the node, as well as any other characteristic that defines a performance variable associated with sending a signal across the node. The characteristics associated with each node may be utilized to select an optimum path for a particular signal from an originating component to a target component.

In accordance with at least some embodiments of the present invention, after various communication routes have been prototyped, a simulation tool may be adapted to assign a proportional load across multiple branches of the tree 600, based on some optimization criteria. This signal prototyping method is may be referred to as "bulk traffic" prototyping—where one prototype signal represents potentially many calls. Therefore, instead of simulating the transmission of all the traffic across one leg or branch 604 of the tree 600, there is/could be a probabilistic function which sends some portion, based on the various path properties, of the traffic across all of the legs or branches 604 of the tree 600.

Figure 9:
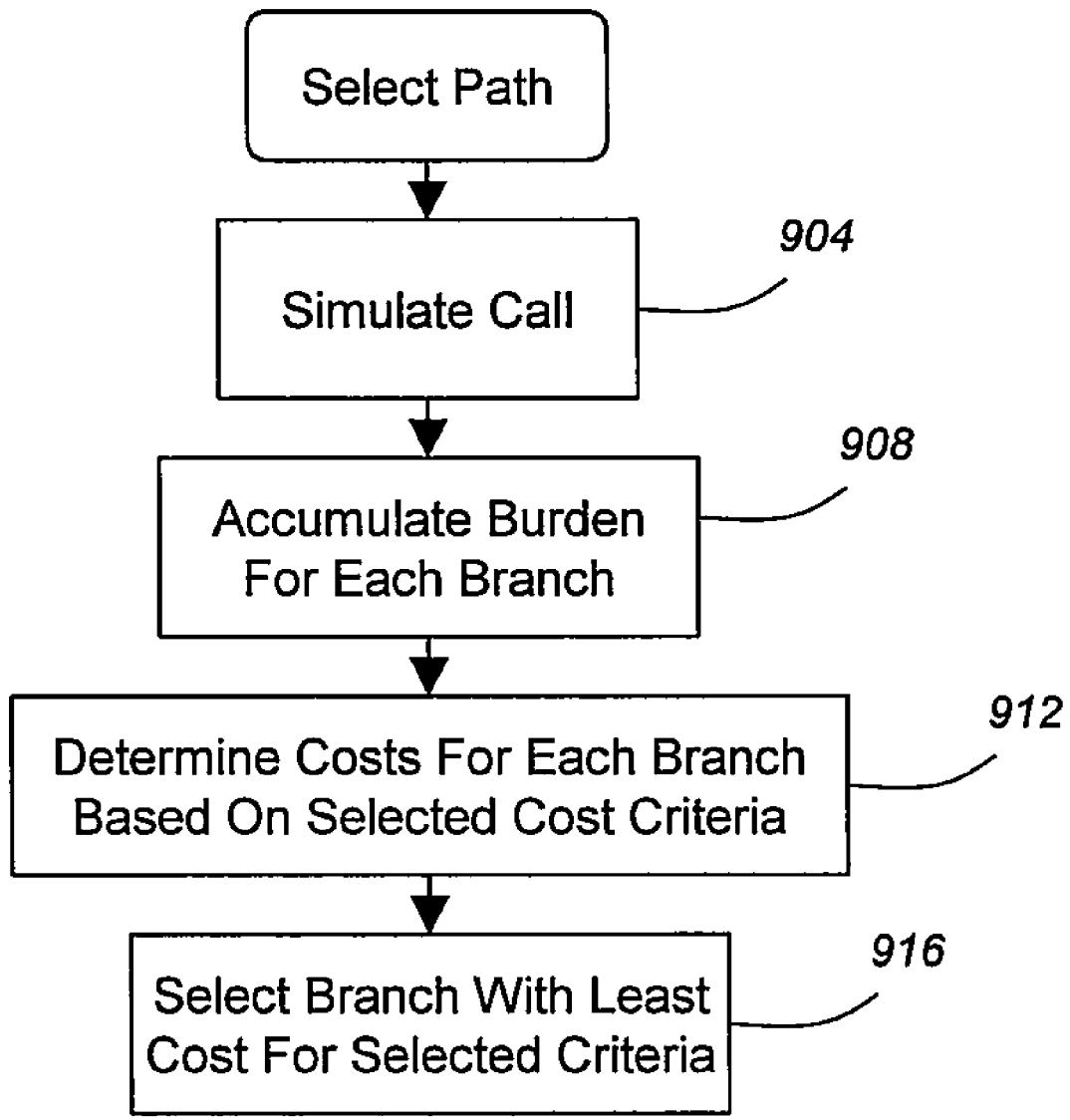
FIG. 9 is a flow diagram depicting a path selection method in accordance with embodiments of the present invention.

With reference now to FIG. 9, a path selection method will be described in accordance with at least some embodiments of the present invention. The path selection method begins when a call or dialog is simulated from an originating component to a target component (step 904). The simulated call may be conceptualized as traversing each branch 604 on a prototyped tree 600. As the nodes of each branch 604 are traversed the characteristics of each node are accumulated for the entirety of the branch 604 (step 908). In other words, when a new node is traversed, the characteristics associated with that node are added to the total characteristics for the branch 604. In this step similar characteristics may be added to one another. For example, the costs associated with each node may be accumulated separately from the QoS associated with each node, which may be accumulated separately from the availability associated with each node.

As the burdens of each branch 604 are accumulated, the total costs in terms of characteristics are determined for each branch 604 (step 912). In this step, the total cost associated with using a branch, the cumulative QoS associated with the branch, the total availability associated with the branch, and any other accumulation of burden/benefit are determined. With the burdens/benefits determined for each branch 604, the originating component can compare the burdens/benefits and select a branch based on the predetermined optimization criteria (step 916). In accordance with at least some embodiments, the originating component may choose to minimize certain characteristics associated with a particular branch or maximize other characteristics. The selection of optimization criteria and rules may be user defined or subject to constraints of the signal itself (e.g., a media signal may require a minimum QoS for intelligibility).

Additionally, certain embodiments of the present invention may be used to perform physical provisioning of a simulated system based on load traffic requirements. More particularly, a simulated system employing intelligent agents 116 in accordance with embodiments of the present invention may be adapted to simulate network traffic over a predetermined period of time, such as "the busy hour". Such a simulation may be used to determine whether the simulated network configuration (which may correspond to an actual network configuration) of components will be able to handle the simulated amount of network traffic. Such simulations may be useful in determining whether the actual network or gateway component configuration should be reconsidered or maintained in its current state based on predicted traffic flows.

Although embodiments of the present invention have been discussed in connection with the analysis of a communication system and its corresponding components, the useful aspects of the present invention are not limited to such applications. For example, embodiments of the present invention may be applied to analyzing circuit board behavior under certain voltage and current loads. The elements of the circuit board (e.g., resistors, capacitors, inductors, transistors, semiconductors, etc.) may each be provided with an intelligent agent 116 that can be used to propagate a signal (e.g., current) through the circuit board. As the current is propagated the properties of each element may be added to the signal prototype until the circuit has been completed, at which point the signal may be propagated back to the originating element. Thus, current flows may be simulated by distributing the intelligence of current propagation to the circuit elements.

As another example, embodiments of the present invention may be employed to analyze fluid dynamics, such as hydraulic systems and HVAC systems, where each component in the system may be provided with an intelligent agent 116 to help support fluid propagation.

As still another example, embodiments of the present invention may be employed to simulate and/or analyze market dynamics. Each factor or element in a particular market (e.g., the NYSE, certain commodities markets, bond markets, etc.) may be provided with an intelligent agent 116 that can simulate the reaction of that element to receiving a particular signal (e.g., market news or market change).

As yet another example, embodiments of the present invention may be adapted for optimizing workflow simulations in a general work environment (e.g., a person or avatar may be represented by an intelligent agent that has logic to refuse or accept and propagate work items or signature authorizations). Alternatively, materials or equipment in a manufacturing or assembly plant may be provided with an intelligent agent to help that particular material or piece of equipment determine whether it is allowed to receive or be received at a particular station in the plant.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the computer and network arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for determining the availability, reliability, and/or provisioning of a particular network based on the failure probability for each component in the network. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
transmitting, by an originating communication component, a prototype ping signal to a plurality of communication components in a communication network, the prototype ping signal comprising an origin identification portion, a target identification portion, a travel history portion, and a signal characteristics portion, wherein the signal characteristics portion describes a protocol, signal type, and signal class of the prototype ping signal, wherein the protocol indicates a current protocol state of the prototype ping signal, the signal type indicates a current signal type of the prototype ping signal, and the signal class indicates a current signal class of the prototype ping signal;

receiving the prototype ping signal at a first communication component in the plurality of communication components, the first communication component comprising an intelligent agent;

analyzing, by the intelligent agent, the travel history portion of the prototype ping signal to determine whether the first communication component is in the travel history portion of the prototype ping signal;

analyzing, by the intelligent agent, the protocol of the prototype ping signal to determine whether the first communication component is capable of at least one of forwarding the prototype ping signal in the current protocol state and transforming the current protocol state to a different protocol state;

analyzing, by the intelligent agent, the signal class and signal type of the prototype ping signal to determine whether the first communication component is capable of forwarding the prototype ping signal in the current signal class and current signal type;

determining, by the intelligent agent of the first communication component and based on the analysis performed by the intelligent agent, whether the first communication component is allowed to accept and forward the prototype ping signal; and the intelligent agent accepting or refusing the prototype ping signal on behalf of the first communication component based on the determination made by the intelligent agent.

2. The method of claim 1, wherein the originating communication component comprises a server, the method further comprising:

making a determination, by the intelligent agent, to accept the prototype ping signal on behalf of the first communication component.

3. The method of claim 2, further comprising:

updating the history portion after the prototype ping signal has been accepted to reflect that the prototype ping signal has been accepted by the first communication component; and forwarding the prototype ping signal with the updated history portion to a second communication component in the plurality of communication components.

4. The method of claim 3, further comprising sending an acceptance message back to the originating communication component, wherein the acceptance message comprises characteristic information associated with the first communication component, the method further comprising:

updating a route prototype tree at the originating communication component that identifies which components in the plurality of communication components have accepted the prototype ping signal and transmitted an acceptance message back to the originating communication component.

5. The method of claim 4, further comprising:

completing at least two branches of the route prototype tree, wherein each of the at least two branches define a different signal flow path from the originating communication component to a target component, wherein there is at least one node difference between the at least two branches, and wherein nodes on the at least two branches comprise characteristic information related to the node; and selecting, based on the characteristic information from the nodes on the at least two branches, a branch from the at least two branches on which a signal will be transmitted from the originating communication component to the target component.

6. The method of claim 5, further comprising:

receiving optimization criteria for selecting the branch;

determining which branch best meets the optimization criteria based on the characteristic information for each node on the branch; and selecting the branch whose characteristic information for each node best meets the optimization criteria.

7. The method of claim 1, further comprising determining that the first communication component is capable of forwarding the prototype ping signal to at least one communication component not listed in the travel history portion prior to making the determination to accept the prototype ping signal.

8. The method of claim 1, wherein the current protocol state comprises at least one of Communication Manager (CM) protocol, Time Division Multiplex (TDM) protocol, packet protocol, IP, and SIP, wherein the current signal class comprises at least one of off-hook, tone, dial, invite, ringing, ring, pickup, busy, no answer, answered, ask, answer, hang up, end ring, end call, register, Interactive Voice Response (IVR) message, TTR message, announcement, message, call setup, call tear down, INVITE, 180 RINGING, 200 OK, and ACK, and wherein the current signal type comprises at least one of control signal, a tone, a Q Signal, and a media.

9. The method of claim 1, further comprising:

making a determination, by the intelligent agent, to refuse the prototype ping signal on behalf of the first communication component; and transmitting a refusal signal back to the originating communication component.

10. A non-transitory computer readable medium comprising processor executable instructions operable to perform the method of claim 1.

11. A system, comprising:

a plurality of communication components each having a corresponding intelligent agent associated therewith, wherein a first communication component is a server and is operable to transmit a prototype ping signal to the plurality of communication components, wherein the prototype ping signal comprises an origin identification portion, a target identification portion, a travel history portion, and a signal characteristics portion, wherein the signal characteristics portion describes a protocol, signal type, and signal class of the prototype ping signal, wherein the protocol indicates a current protocol state of the prototype ping signal, the signal type indicates a current signal type of the prototype ping signal, and the signal class indicates a current signal class of the prototype ping signal, further wherein an intelligent agent associated with a recipient component of the prototype ping signal is operable to (i) analyze the travel history portion of the prototype ping signal to determine whether the recipient component is in the travel history portion of the prototype ping signal, (ii) analyze the protocol of the prototype ping signal to determine whether the recipient component is capable of at least one of forwarding the prototype ping signal in the current protocol state and transforming the current protocol state to a different protocol state, (iii) analyze the signal class and signal type of the prototype ping signal to determine whether the recipient component is capable of forwarding the prototype ping signal in the current signal class and current signal type, and (iv) based on the analysis performed by the intelligent agent, determine whether the recipient component is allowed to accept and forward the prototype ping signal.

12. The system of claim 11, wherein the intelligent agent associated with the recipient component comprises a backflush logic module operable to analyze the travel history portion of the prototype ping signal, determine that the recipient component is not in the travel history portion, and make a determination to accept the prototype ping signal on behalf of the recipient component.

13. The system of claim 12, wherein the intelligent agent associated with the recipient component further comprises a test forward logic module operable to determine that the recipient component is capable of forwarding the prototype ping signal to at least one communication component not listed in the travel history portion prior to making the determination to accept the prototype ping signal.

14. The system of claim 12, wherein the intelligent agent further comprises a candidate generator configured to update the history portion after the prototype ping signal has been accepted to reflect that the prototype ping signal, has been accepted by the recipient component and forward the prototype ping signal with the updated history portion to another communication component.

15. The system of claim 14, wherein the candidate generator is further operable to send an acceptance message back to the first communication component, wherein the acceptance message comprises characteristic information associated with the recipient component such that the first communication component can update a route prototype tree that identifies which components in the plurality of communication components have accepted the prototype ping signal and transmitted an acceptance message back to the first communication component.

16. The system of claim 15, wherein the first communication component is operable to complete at least two branches of the route prototype tree, wherein each of the at least two branches define a different signal flow path from the first communication component to a target component, wherein there is at least one node difference between the at least two branches, wherein nodes on the at least two branches comprise characteristic information related to the node, and wherein the first communication component is further operable to select, based on the characteristic information from the nodes on the at least two branches, a branch from the at least two branches on which a signal will be transmitted from the first communication component to the target component.

17. The system of claim 16, wherein the first communication component is further operable to receive optimization criteria for selecting the branch, determine which branch best meets the optimization criteria based on the characteristic information for each node on the branch, and select the branch whose characteristic information for each node best meets the optimization criteria.

18. The system of claim 11, wherein the current protocol state comprises at least one of Communication Manager (CM) protocol, Time Division Multiplex (TDM) protocol, packet protocol, IP, and SIP, wherein the current signal class comprises at least one of off-hook, tone, dial, invite, ringing, ring, pickup, busy, no answer, answered, ask, answer, hang up, end ring, end call, register, Interactive Voice Response (IVR) message, TTR message, announcement, message, call setup, call tear down, INVITE, 180 RINGING, 200 OK, and ACK, and wherein the current signal type comprises at least one of control signal, a tone, a Q Signal, and a media.

19. The system of claim 11, wherein the intelligent agent is operable to make a determination to refuse the signal on behalf of the recipient component and transmit a refusal signal back the first communication component.

* * * * *